(12) United States Patent
Claude et al.

(10) Patent No.: US 10,552,086 B2
(45) Date of Patent: Feb. 4, 2020

(54) GLOBAL POOL OF GARBAGE COLLECTION UNITS (GCUS) IN A SHARED NON-VOLATILE MEMORY DEVICE

(71) Applicant: Seagate Technology LLC, Cupertino, CA (US)

(72) Inventors: David W. Claude, Loveland, CO (US); Steven S. Williams, Longmont, CO (US); Stacey Secatch, Niwot, CO (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 16/021,870

(22) Filed: Jun. 28, 2018

(65) Prior Publication Data

US 2020/0004457 A1 Jan. 2, 2020

(51) Int. Cl.
*G06F 12/00* (2006.01)
*G06F 3/06* (2006.01)
*G06F 12/02* (2006.01)

(52) U.S. Cl.
CPC .......... *G06F 3/0659* (2013.01); *G06F 3/0611* (2013.01); *G06F 3/0631* (2013.01); *G06F 3/0679* (2013.01); *G06F 12/0246* (2013.01); *G06F 12/0253* (2013.01); *G06F 2212/1024* (2013.01); *G06F 2212/7202* (2013.01); *G06F 2212/7205* (2013.01)

(58) Field of Classification Search
CPC .... G06F 3/0659; G06F 3/0611; G06F 3/0631; G06F 3/0679; G06F 12/0246; G06F 12/0253; G06F 2212/1024; G06F 2212/7202; G06F 2212/7205
See application file for complete search history.

(56) References Cited

U.S. PATENT DOCUMENTS

| | | | |
|---|---|---|---|
| 8,086,893 B1 | 12/2011 | MacFarland et al. | |
| 8,694,724 B1 | 4/2014 | Linnell et al. | |
| 2018/0246821 A1* | 8/2018 | Kanno | G06F 13/1668 |

\* cited by examiner

*Primary Examiner* — Shawn X Gu
(74) *Attorney, Agent, or Firm* — Hall Estill Attorneys at Law (57) ABSTRACT

Apparatus and method for managing shared resources in a data storage device such as a solid-state drive (SSD). In some embodiments, a non-volatile memory (NVM) has a population of semiconductor memory dies which are divided into die sets for different users. Each die set includes user garbage collection units (GCUs) for storage of user data blocks by the associated user and overprovisioned global GCUs to store user data blocks from the users of the other die sets. When an imbalance condition exists such that the workload traffic level of a first die set exceeds a workload traffic level of a second die set, at least one host I/O command for the first die set is offloaded for servicing using a selected global GCU of the second die set. The offloaded data may be subsequently transferred to the first die set after the imbalance condition is resolved.

20 Claims, 6 Drawing Sheets

GLOBAL POOL OF GARBAGE COLLECTION UNITS (GCUS) IN A SHARED NON-VOLATILE MEMORY DEVICE

SUMMARY

Various embodiments of the present disclosure are generally directed to the management of shared resources in a multi-user storage environment, such as in a solid state drive (SSD).

In accordance with some embodiments, a non-volatile memory (NVM) has a population of semiconductor memory dies which are divided into die sets for different users. Each die set includes user garbage collection units (GCUs) for storage of user data blocks by the associated user and global GCUs to store user data blocks from the users of the other die sets. When an imbalance condition exists such that the workload traffic level of a first die set exceeds a workload traffic level of a second die set, at least one host I/O command for the first die set is offloaded for servicing using a selected global GCU of the second die set. The offloaded data may be subsequently transferred back to the first die set after the imbalance condition is resolved.

These and other features which may characterize various embodiments can be understood in view of the following detailed discussion and the accompanying drawings.

DETAILED DESCRIPTION

Solid state drives (SSDs) are data storage devices that store user data in non-volatile memory (NVM) made up of an array of solid-state semiconductor memory cells. SSDs usually have an NVM module and a controller. The controller directs the transfer of user data between the NVM and a host device. The NVM will usually be NAND flash memory, but other forms of solid-state memory can be used.

The NVMe specification is an industry adopted standard that describes various interface and operational characteristics of SSDs and to her NVM storage devices. The NVMe specification allows different portions of an SSD storage capacity to be assigned to different users for concurrent access and use via one or more PCIe (Peripheral Component Interface Express) interfaces. The portion of the capacity assigned to each NVMe user is referred to as an "NVM set" or "namespace." The specification provides that NVM sets are logically separate and may be physically separate as well, although at present the specification does not go into detail on how an NVM set may be physically separated from the rest of the SSD memory.

NAND flash memory cells are arranged into erasure blocks, which represent the smallest grouping of memory cells that can be erased at a time. Garbage collection operations are carried out as background routines to periodically recycle the erasure blocks for reuse. A garbage collection operation generally includes searching the erasure block(s) for current version data, rewriting the current version data to a new location, and then applying an erasure operation to reset the memory cells. Erasure blocks are usually grouped into larger garbage collection units (GCUs) that incorporate erasure blocks from different dies and which can be erased and allocated as a unit.

It follows that SSDs and other data storage devices are often configured to carry out three (3) main operations: (1) hot data transfers, which involve servicing host commands to transfer user data to and from the NVM; (2) cold data transfers, which are non-host based (e.g., background) transfers of current version data to a new location within the NVM for various reasons such as during garbage collection operations, and (3) map data updates, which are another form of non-host based (background) transfers in which map data snapshots and/or journal updates are written to the NVM.

Deterministic processing modes require the SSD or other storage device to provide host performance at some specified I/O transfer rate level or other metric. The background transfers should be carried out at a sufficient rate to ensure adequate storage space is available and map integrity is maintained to support the hot data transfers. A complicating factor associated with the maintenance of consistent I/O transfer rate performance across multiple sets is the variability in workload traffic that can be provided to the various NVM sets over time.

Various embodiments of the present disclosure are thus generally directed to an apparatus and method for providing workflow management in a data storage device, such as but not limited to an SSD operated in accordance with the NVMe specification. As explained below, some embodiments provide an NVM with a population of semiconductor memory dies which are divided into some number of NVM sets for the storage of user data by different owners. Each NVM set (also sometimes referred to as a die set) is arranged into a user data storage space to store user data blocks from the associated owner, as well as an overprovisioned (OP) data storage space to store user data blocks from a different owner of a different die set. The respective user and OP spaces may be arranged as garbage collection units (GCUs), comprising erasure blocks arranged across multiple dies that are allocated and erased as a unit.

A workload controller monitors workload traffic across the various sets. At such time that an imbalance condition is detected such that a first set is experiencing a significantly greater amount of traffic as compared to other sets, the workload controller may operate to offload the storage of data sets from the first set to the OP space of a second set with a lower level of traffic. In this way, sustained quality of service is nominally provided to all of the sets irrespective of the then-existing workload levels.

In this way, a collection of "global" GCUs or other resources from among the various sets can be provided for use at any given time to temporarily store data from other sets. The data can be subsequently migrated back to the correct sets at a later time. The various global resource groupings can be allocated differently depending on resource allocations and limitations, such as different dies within the same channels, different channels with a variable number of channels, etc. In some cases, the global GCUs may span multiple NVM sets and be individually configurable for a given situation.

Figure 1:
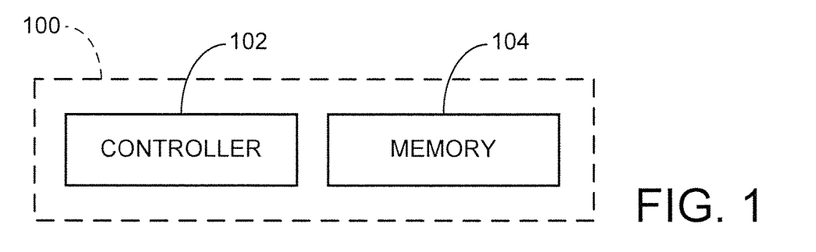
FIG. 1 provides a functional block representation of a data storage device in accordance with various embodiments.

These and other features and advantages of various embodiments can be understood beginning with a review of FIG. 1 which provides a functional block diagram of a data storage device 100. The device 100 has a controller 102 and a memory module 104.

The controller block 102 represents a hardware based and/or programmable processor based circuit configured to provide top level communication and control functions. The memory module 104 includes solid state non-volatile memory (NVM) for the storage of user data from a host device.

Figure 2:
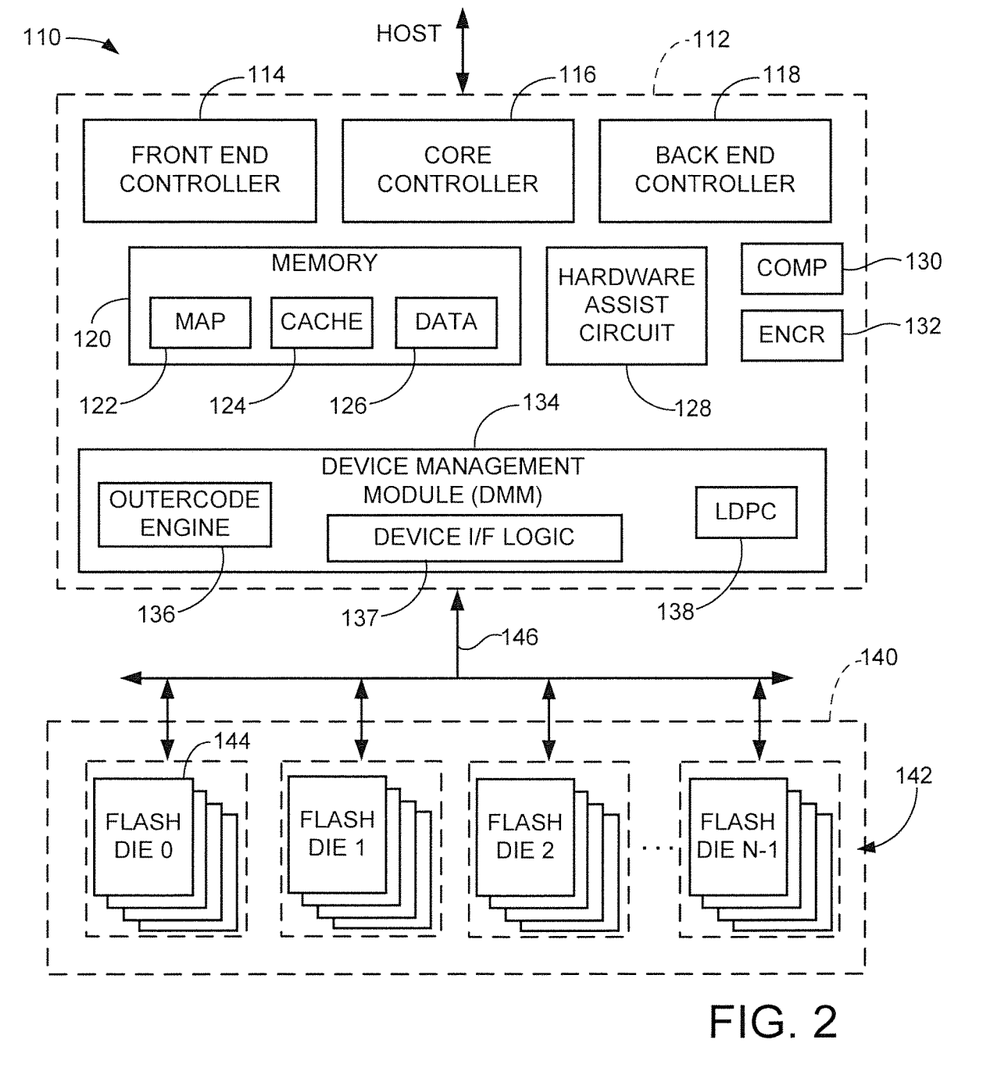
FIG. 2 shows aspects of the device of FIG. 1 characterized as a solid state drive (SSD) in accordance with some embodiments.

FIG. 2 shows a data storage device 110 as a particular embodiment of the device 100 in FIG. 1. The device 110 is configured as a solid state drive (SSD) that communicates with one or more host devices via one or more Peripheral Component Interface Express (PCIe) ports. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate NVM sets (die sets) for use in the storage of data. Each NVM set may form a portion of an NVMe namespace that may span multiple SSDs or be contained within a single SSD.

The SSD 110 includes a controller circuit 112 with a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can alternatively be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 128 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 112, such as a data compression block 130 and an encryption block 132. The data compression block 130 applies lossless data compression to input data sets during write operations, and subsequently provides data de-compression during read operations. The encryption block 132 provides any number of cryptographic functions to input data including encryption, hashes, decompression, etc.

A device management module (DMM) 134 supports back end processing operations and may include an outer code engine circuit 136 to generate outer code, a device I/F logic circuit 137 and a low density parity check (LDPC) circuit 138 configured to generate LDPC codes as part of the error detection and correction strategy used to protect the data stored by the by the SSD 110.

A memory module 140 corresponds to the memory 104 in FIG. 1 and includes a non-volatile memory (NVM) in the form of a flash memory 142 distributed across a plural number N of flash memory dies 144. Rudimentary flash memory control electronics (not separately shown in FIG. 2) may be provisioned on each die 144 to facilitate parallel data transfer operations via a number of channels (lanes) 146.

Figure 3:
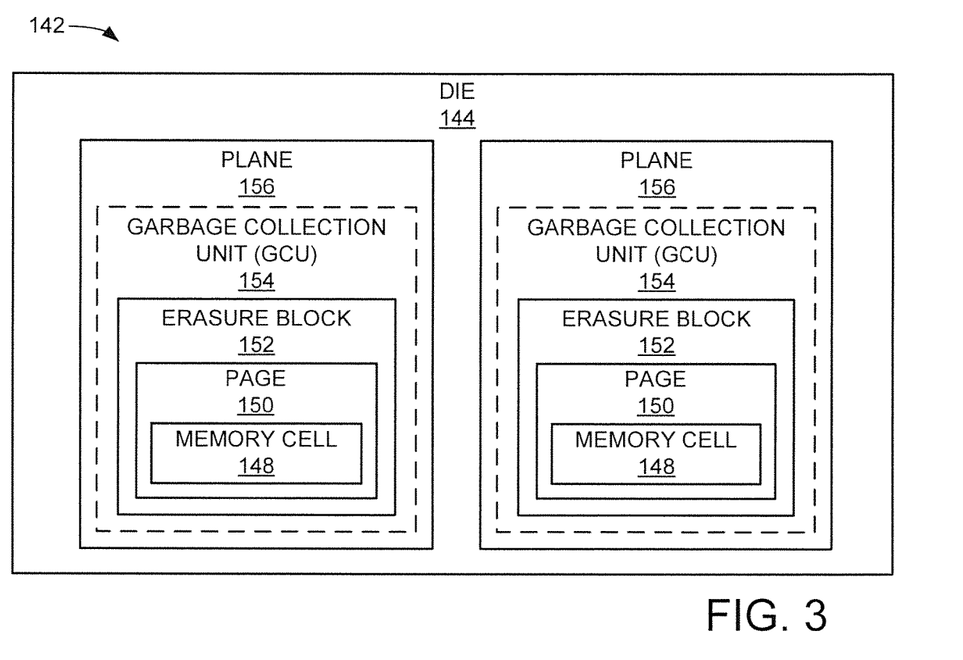
FIG. 3 shows an arrangement of the flash memory of FIG. 2 in some embodiments.

FIG. 3 shows a physical/logical arrangement of the various flash memory dies 144 in the flash memory 142 of FIG. 2 in some embodiments. Each die 144 incorporates a large number of flash memory cells 148. The cells may be arrayed in a two-dimensional (2D) or three-dimensional (3D stacked) arrangement with various control lines (e.g., source, bit, word lines) to access the cells.

Groups of cells 148 are interconnected to a common word line to accommodate pages 150, which represent the smallest unit of data that can be accessed at a time.

Depending on the storage scheme, multiple pages of data may be written to the same physical row of cells, such as in the case of MLCs (multi-level cells), TLCs (three-level cells), XLCs (four-level cells), and so on. Generally, n bits of data can be stored to a particular memory cell 148 using $2^n$ different charge states (e.g., TLCs use eight distinct charge levels to represent three bits of data, etc.). The storage size of a page can vary; some current generation flash memory pages are arranged to store 16 KB (16,384 bytes) of user data.

The memory cells 148 associated with a number of pages are integrated into an erasure block 152, which represents the smallest grouping of memory cells that can be concurrently erased in a NAND flash memory. A number of erasure blocks 152 are turn incorporated into a garbage collection unit (GCU) 154, which are logical storage units that utilize erasure blocks across different dies as explained below. GCUs are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle the GCU. This includes identifying and relocating the current version data to a new location, followed by an erasure operation to reset the memory cells to an erased (unprogrammed) state. The recycled GCU is returned to an allocation pool for subsequent allocation to begin storing new user data. In one embodiment, each GCU 154 nominally uses a single erasure block 152 from each of a plurality of dies 144, such as 32 dies.

Each die 144 may further be organized as a plurality of planes 156. Examples include two planes per die as shown in FIG. 3, although other numbers of planes per die, such as four planes per die, etc. can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
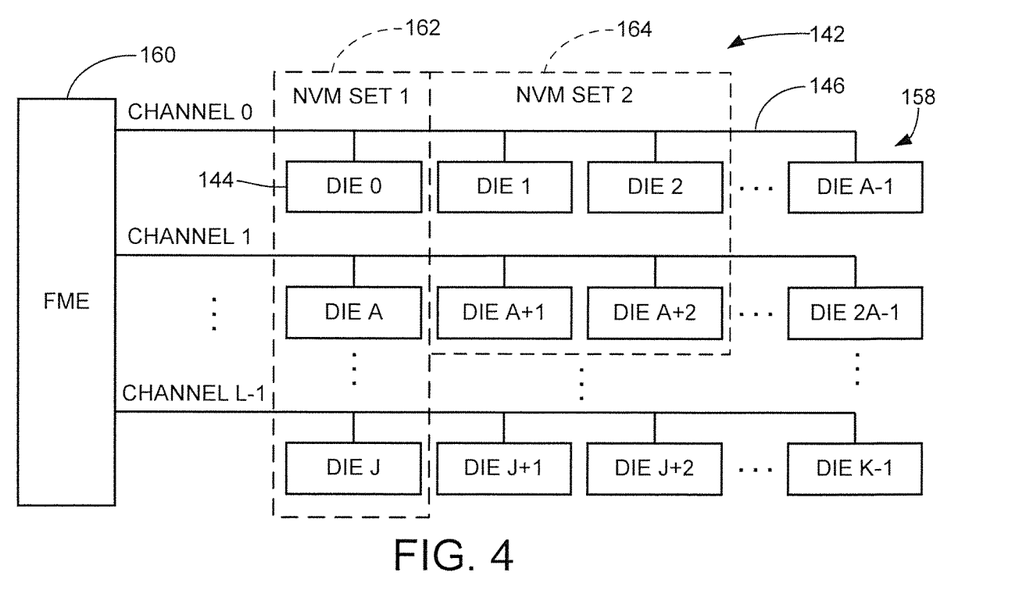
FIG. 4 illustrates the use of channels to access the dies in FIG. 3 in some embodiments.

FIG. 4 shows further aspects of the flash memory 142 in some embodiments. A total number K dies 144 are provided and arranged into physical die groups 158. Each die group 158 is connected to a separate channel 146 using a total number of L channels. Flash memory electronics (FME) circuitry 160 of the flash memory module 142 controls each of the channels 146 to transfer data to and from the respective die groups 158. In one example, K is set to 128 dies, L is set to 8 channels, and each physical die group has 16 dies. In this way, any of the 16 dies physically connected to a given channel 146 can be accessed at a given time using the associated channel. Generally, only one die per channel can be accessed at a time.

In some embodiments, the various dies are arranged into one or more NVM sets. An NVM set, also referred to a die set, represents a portion of the storage capacity of the SSD that is allocated for use by a particular host (user/owner). NVM sets are established with a granularity at the die level, so that each NVMe (die) set will encompass a selected number of the available dies 144.

A first example NVM set is denoted at 162 in FIG. 4. This first set 162 uses a single die 144 from each of the different channels 146. This arrangement provides fast performance during the servicing of data transfer commands for the set since all eight channels 146 are used to transfer the associated data to service a host access command. A limitation with this approach is that if the set 162 is being serviced, no other NVM sets can be serviced during that time interval. While the set 162 only uses a single die from each channel, the set could also be configured to use multiple dies from each channel, such as four (4) dies per channel for a total of 32 dies.

A second example NVM set is denoted at 164 in FIG. 4. This set uses dies 144 from less than all of the available channels 146. This arrangement provides relatively slower overall performance during data transfers as compared to the set 162, since for a given size of data transfer, the data will be transferred using fewer channels. However, this arrangement advantageously allows the SSD to service multiple NVM sets at the same time, provided the sets do not share the same (e.g., an overlapping) channel 146.

Figure 5:
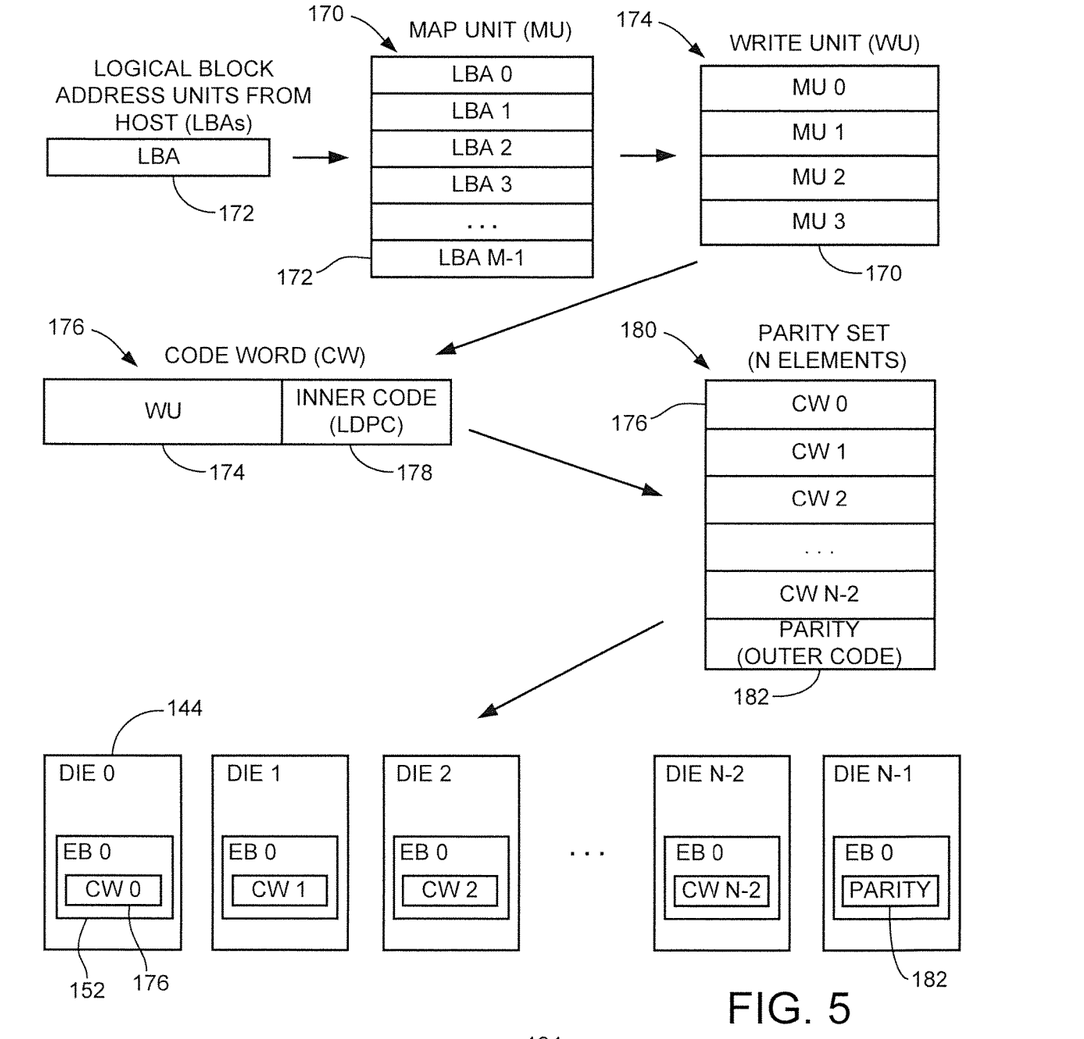
FIG. 5 illustrates a map unit (MU) as a data arrangement stored to the flash memory of FIG. 2.

FIG. 5 illustrates a manner in which user data are stored to the flash memory module 142 in accordance with some embodiments. Map units (MUs) 170 represent fixed sized blocks of data that are made up of one or more user logical block address units (LBAs) 172 supplied by the host. Without limitation, the LBAs 172 may have a first nominal size, such as 512 bytes (B), 1024B (1 KB), etc., and the MUs 170 may have a second nominal size, such as 4096B (4 KB), etc. The application of data compression may cause each MU to have a smaller size in terms of actual bits written to the flash memory 142.

As noted above, in one example each page 150 represents nominally 16 KB of user data capacity. Hence, each set of four (4) MUs 170 will be grouped together to form a write units (WU) 174 of nominally 16 KB of user data.

A code word (CW) 176 is formed by appending, to the WU 174, an inner code value 178. It is contemplated that the inner code constitutes low density parity check (LDPC) codes, although other error correction schemes can be used. The number of code bits will vary, but may be on the order of about 10 KB or so for 16 KB of user data, depending on the construction of the flash memory 142. As will be recognized, LDPC codes enable fast detection and correction of read errors during a read operation. The inner codes 178 may be generated by the LDPC module 138 (see FIG. 2) in preparation of writing of the WU 174 to the flash memory.

Some number of code words 176 are grouped together to form a parity set 180 having N elements. Nominally, the value N will be based on the number of erasure blocks 152 in a given GCU 154, although this is not necessarily required. For the present example, it is contemplated that N=32 although other numbers of elements can be used. As shown in FIG. 5, the parity set 180 will have N−1 code words 176 (e.g., N−1=31) plus an appended parity value 182. Each of the various code words 176 and the associated parity value 182 are written as a different page of data in the GCU. More particularly, the code words and parity values for a given parity data set may be written to the same page and same designated erasure block (e.g., EB 0) across the respective dies, as shown.

The parity value 182 represents outer code and can take any number of forms.

Figure 6:
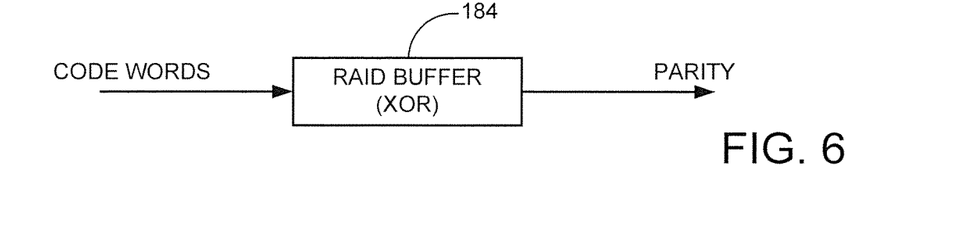
FIG. 6 shows the use of a buffer to generate the parity value in FIG. 5 in accordance with some embodiments.

Without limitation, in one embodiment the parity value 182 represents the output of an exclusive-or (XOR) function applied to the N−1 code words 176. FIG. 6 shows a RAID buffer 184 configured to receive and accumulate the 31 code words 176 in each parity set 180 to generate the parity value 182. In this way, the data from the parity set can be reconstructed even in the event of a single die failure. It follows that nominally 16 KB of parity data protects (16 KB)(31)=496 KB of user data in each parity set, for an overhead ratio of about 3.2%.

The parity sets stored by the SSD 110 are managed using metadata. The metadata provide map structures to track the locations of various data blocks (e.g., MUs 170) to enable the SSD 110 to locate the physical location of existing data within the flash memory 142. During the servicing of a read command, it is generally necessary to locate the physical address within the flash memory 142 at which the most current version of a requested block (e.g., LBA) is stored, so that the controller can schedule and execute a read operation to return the requested data to the host.

During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 7:
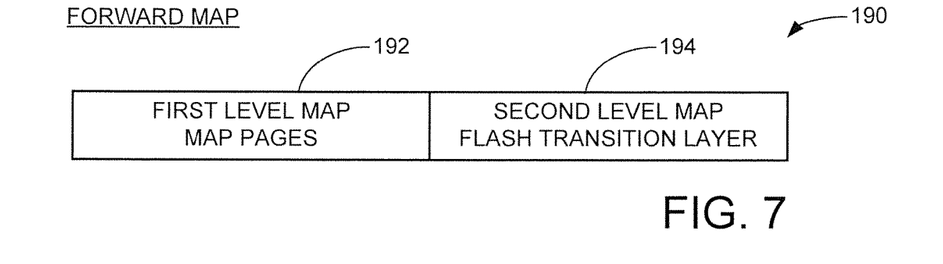
FIG. 7 shows an exemplary format for a forward map used by the SSD in some embodiments.

FIG. 7 shows an example format for a forward map 190 used by the SSD 110 in some embodiments. A two-level map is depicted, although single level or other multi-level maps with three or more levels can be provided as desired.

The forward map 190 includes a first level map 192 and a second level map 194. The first level map 192 provides map pages to identify, for a given range of logical addresses, the entries in the second level map 194. The entries in the second level map 194 provide a flash transition layer (FTL) to generally provide a correlation between the logical addresses of various blocks (e.g., MUs) and the physical addresses at which the various blocks are stored (e.g., NVM set, die, plane, GCU, EB, page, bit offset, etc.).

Forward pointers may be written to the various entries such that, when accessing the map pages and FTL entries, a forward search may take place to locate the final, most current version of a given data block. Once this location is identified, the associated data can be retrieved, etc.

It is generally required that accurate map data be maintained in order to reconstruct the state of the system. A local copy of the map data (or portions thereof) may be maintained in local volatile memory for ease of use by the controller 112. From time to time, the map data may be updated and transferred to the flash memory to provide non-volatile data storage of the map information. The map data may be arranged into parity sets in a manner similar to that described above in FIG. 5 for the host user data written to the flash memory. This will include the periodic generation of map parity values using the buffer 184 of FIG. 6.

Figure 8:
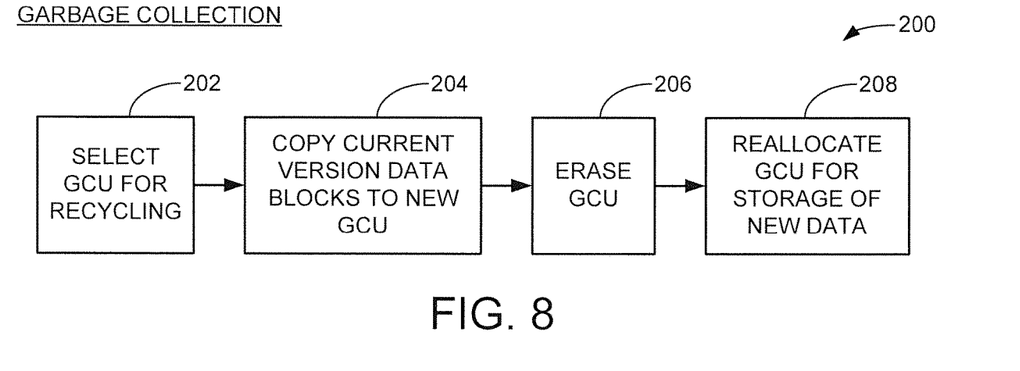
FIG. 8 is a sequence diagram to illustrate a garbage collection operation carried out by the SSD in some embodiments.

FIG. 8 shows a sequence diagram for a garbage collection operation 200. As noted above, garbage collection is a background operation used to collect and relocate current version data prior to an erasure operation upon a GCU to reset the GCU to receive new user and/or map data. The sequence 200 includes the selection of a particular GCU for recycling, as shown by block 202.

The current version user data blocks within the GCU are identified and relocated to a new location at block 204. This can be carried out by referencing the forward map 190, or by using other mechanisms including referencing a reverse directory written to each GCU that lists the contents of the GCU. If the forward map provides a logical-to-physical data structure, the reverse directory can be thought of as a physical-to-logical data structure that indicates, at various physical locations within the GCU, the logical addresses (e.g., MUs) of the blocks at those physical locations.

As part of the processing at block 204, the valid data may be grouped into new parity sets in a manner similar to that shown above in FIG. 5, including the generation of parity data as shown in FIG. 6, and the parity sets will be written to a different GCU.

Block 206 shows the application of an erasure operation to erase the memory cells within the GCU. Once erased, the GCU is returned to a GCU allocation pool for future allocation for storage of new data, as indicated by block 208.

Figure 9:
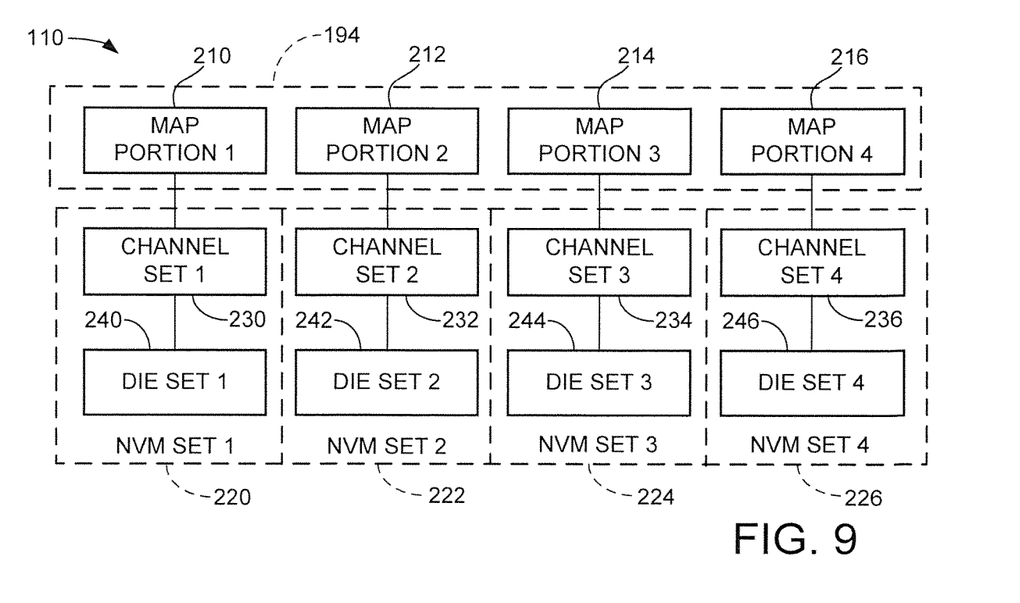
FIG. 9 shows the segregation of the forward map into various map portions for different channel and die sets in accordance with some embodiments.

FIG. 9 shows the forward map 190 of FIG. 7 arranged into four (4) distinct and independent sets of map data, also referred to as map portions 220, 222, 224, 226. The map portions are denoted as map portions 1-4 and serve to describe the user data in four (4) corresponding NVM sets 220, 222, 224, 226 (NVM sets 1-4). The division of the forward map in this manner provides certain processing advantages, but is not necessarily required.

The NVM sets 1-4 each have an associated channel set 230, 232, 234, 236 and an associated grouping of dies 240, 242, 244, 246. In one example, each of the channel sets 1-4 constitutes two (2) of the eight (8) available channels 146, although other arrangements can be used so that the channel sets are overlapping and shared by two or more of the NVM sets. The map portions 1-4 each independently describe the user data stored in the associated die sets 1-4. For purposes of the present discussion, it will be contemplated that each of the NVM sets 1-4 comprise 32 total dies connected to two (2) of the eight (8) available channels, although other groupings can be used. Each NVM set will be controlled by an associated set controller (not separately shown), which comprises a portion of the functionality of the controller 112 dedicated to manage the hot, cold and map update transfers for the associated set.

Figure 10:
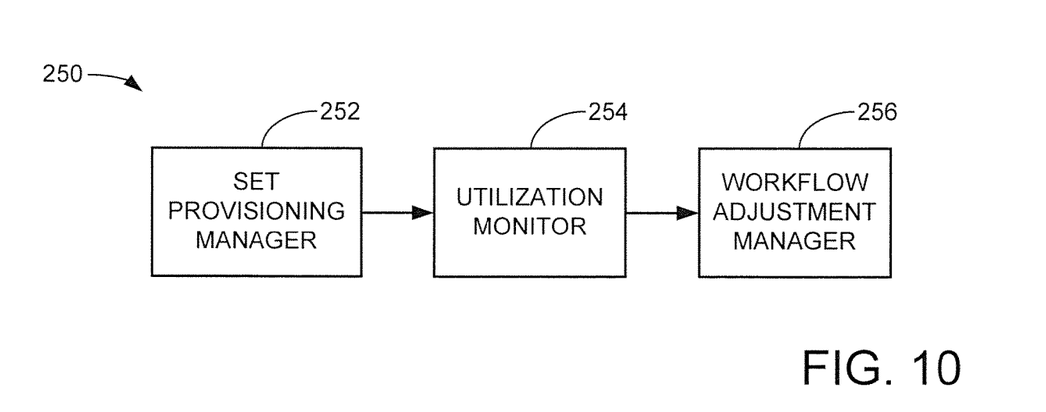
FIG. 10 shows a workload controller configured to enhance data transfer performance of the SSD in some embodiments.

FIG. 10 shows a functional representation of a workload controller 250. The workload controller is a hardware and/or programmable processor based circuit that is incorporated into the functionality of the SSD controller 112 (FIG. 2). The workload controller generally operates to maintain desired levels of data transfer performance across the various NVM sets.

The workload controller 250 includes a set provisioning manager 252, a utilization monitor 254 and a workflow adjustment manager 256. The provisioning manager 252 operates to configure the SSD 110 to divide the available dies 144 among multiple NVM sets. For each set, the provisioning manager 252 further operates to arrange the available memory into various forms of storage resources, including dedicated resources and global (shared or sharable) resources.

Figure 11:
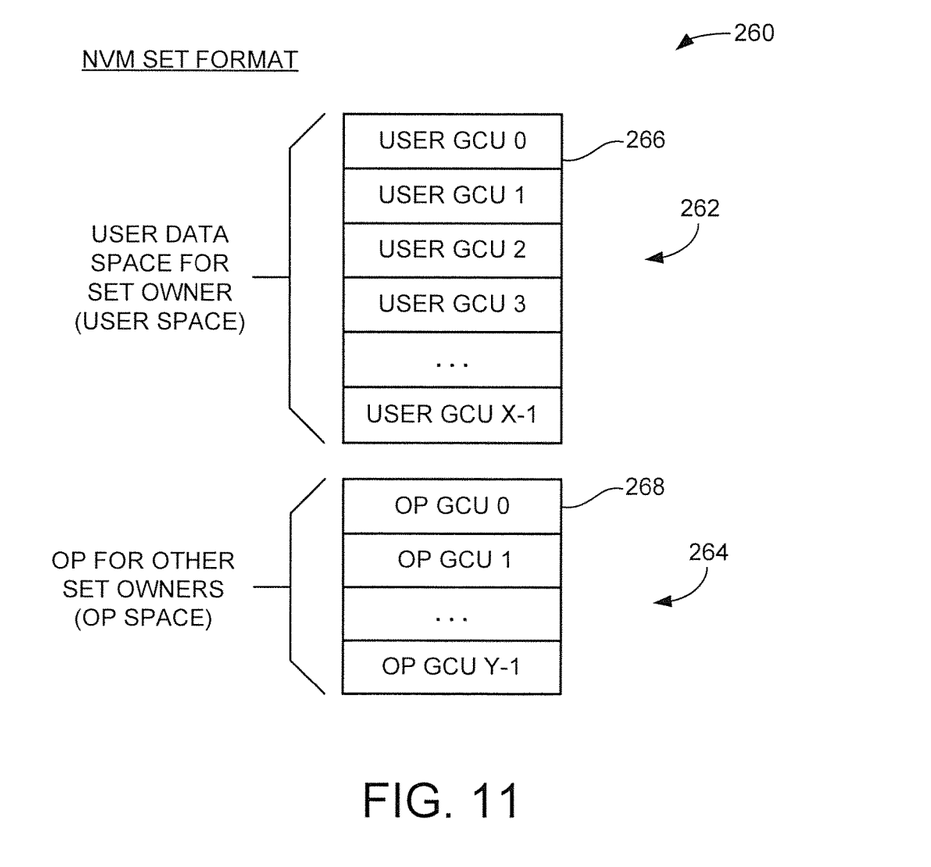
FIG. 11 shows an exemplary format for a selected NVM set arranged by the workload controller of FIG. 10 to have a user data space and an overprovisioned (OP) space.

FIG. 11 is a schematic depiction of a selected NVM set 260 arranged by the set provisioning manager of FIG. 10 in some embodiments. The NVM set 260 generally corresponds to each of the individual NVM sets 220, 222, 224, 226 in FIG. 9.

Beyond the capacity of an SSD that is advertised to a user, an SSD device traditionally has some additional non-advertised capacity that can be used internally by the device. This additional memory capacity is sometimes referred to as overprovisioned memory, or OP. Because flash memory requires the ability to write new data sets to new locations, some minimum amount of available unprogrammed memory needs to be available so that garbage collection operations can be carried out at all times.

The OP does not necessarily represent some amount of reserved physical memory that is maintained separate from a main memory used to store data sets. Rather, the OP describes some percentage of additional memory (e.g., "open space") that is maintained in, and moves around within, the available memory pool. An example amount of 10-20% OP might be typical in some cases, although other amounts can be used. It will be appreciated that over the lifetime of the SSD, wear may result in the deallocation of blocks from further use, which can erode the available OP. As OP decreases, the amount of write amplification (WA) tends to increase, which relates to the number of times a given data set is rewritten within the memory. Thus, management of the available OP is an important consideration in maintaining desired levels of performance.

FIG. 11 shows the example NVM set 260 to include a user data space 262 and an op space 264. The user data space 262 includes a plural number X of user GCUs 266. As discussed above, each of the user GCUs 266 are made available to store user data from the owner of the set 260 and will nominally comprise 32 erasure blocks 152, with each erasure block taken from a different die 144. In this way, the user GCUs 266 are normal or dedicated GCUs that are owned and controlled by the associated set controller for the set 260.

The op space 264 includes a plural number Y of op GCUs 268. The op GCUs are global or shared GCUs that are made available for use by the set controllers of other sets. While the respective numbers X and Y can take any suitable respective values depending on the configuration and operational requirements of a given SSD, it is contemplated that X will tend to be significantly greater than Y, so that a relatively large number of dedicated user GCUs 266 and a relatively small number of global op GCUs 268 will be provided in each set 260. It will be appreciated that sufficient op space apart from the op GCUs 268 will be maintained to support efficient management of the user GCUs 266, so that the op GCUs 268 do not consume all of the available overprovisioned memory within the set 260.

Referring again to FIG. 10, the utilization monitor 254 operates to monitor the respective workload traffic applied to each of the NVM sets 260 in the system. The utilization monitor can use a variety of criteria to assess the state of the system, but generally, the monitor 254 is configured to detect unbalanced workflow conditions where one particular set has a significantly greater amount of data transfers as compared to other sets. For example, at any given point in time, a first set may be experiencing a relatively high number of I/O operations (e.g., write and read host commands) while a second set may be idle or experiencing a relatively low number of I/O operations.

When such an imbalance exists, the workflow adjustment manager 256 in FIG. 10 may operate to redirect some write operations from the first set to the op space 264 of the second set. This allows the less utilized resources of the second set to temporarily support the I/O operations of the first set and maintain a specified quality of service level for the user of the first set.

Figure 12:
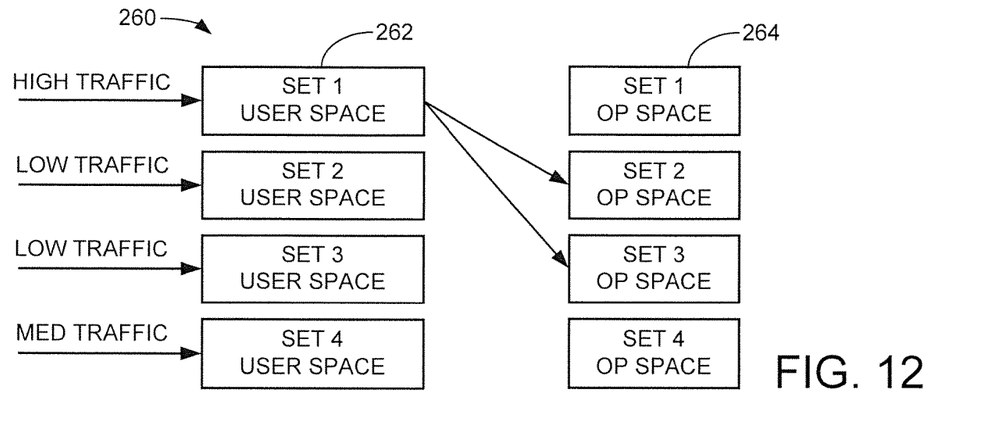
FIG. 12 illustrates the operation of the workload controller to offload certain traffic from a first set to the OP space of one or more other sets.

FIG. 12 is a functional block diagram illustrating the respective user space 262 and op space 264 from FIG. 11 for the four (4) exemplary NVM sets 260 under consideration in the present example. As detected by the utilization monitor 254, the first set (set 1) has a relatively high traffic level, the second and third sets (sets 2 and 3) have relatively low traffic levels, and the fourth set (set 4) has a medium traffic level. In this case, some write commands are offloaded from the first set to the second set. These offloaded write commands result in parity sets (as arranged in FIG. 5) to be written to one or more of the op GCUs 268 in FIG. 11 for the second set.

Depending on the usage rate variability, write commands may be offloaded to multiple sets, such as to both the second and third sets as represented in FIG. 2. No offloading of write data sets is shown for the medium traffic level of set 4, but it will be understood that one or more write commands could be offloaded from this set as well if needed to maintain performance within acceptable ranges.

When write data sets are offloaded to the op space of a different set, the map metadata (e.g., map portions 1-4 in FIG. 9) is updated to reflect the locations of the offloaded data sets. This allows the system to track and locate the data sets to service subsequent read commands. Thus, some level of coordination will be carried out between and among the various set controllers to track the respective data sets.

Figure 13:
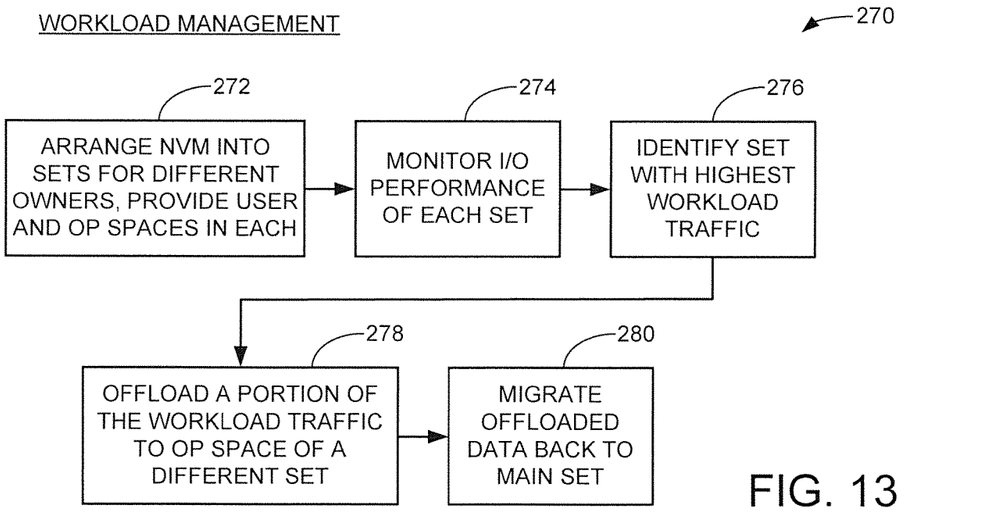
FIG. 13 is a sequence diagram to illustrate further operations of the workload controller in some embodiments.

FIG. 13 is a sequence diagram 270 to illustrate workload management operations carried out by the workload controller 250 in some embodiments. It will be appreciated that any number of additional operations may be carried out in addition to those presented in FIG. 13, so that the flow is exemplary and not limiting.

Initially, the set provisioning manager 252 (FIG. 10) operates at block 272 to arrange a population of NVM units (e.g., semiconductor dies) into different NVM sets for dedicated use for the storage of user data by an associated owner. Each set is further arranged to have a dedicated user space and a global op space. Each of these spaces may be further arranged into GCUs 266, 268 of selected size and capacity. The configuration operation of block 272 can be carried out initially during device manufacture or during a configuration operation when the device is first installed in an end-use environment. The configuration operations can further be carried out during the operational service life of the device, such as to account for the addition of new users, the failure and deallocation of dies, etc.

Block 274 shows the monitoring of the host I/O performance of each of the sets established in block 272. This is carried out by the utilization monitor 254 in FIG. 10. As noted above, the performance can be carried out in a number of ways, including but not limited to measuring total respective numbers of commands issued by each user, the total volume of data transferred by each user, the relative number of reads v. writes, etc. The monitor may further take into account whether a user has entered a deterministic window (DW), which may be a specified period of time during which guaranteed deterministic (e.g., predictable) performance at a specified level is maintained, etc.

The utilization monitor 254 generally operates to switch between two modes: a normal mode and an imbalanced mode. During normal mode, all host I/O transfers are confined within the associated NVM sets. During imbalanced mode, some amount of offloading of workload occurs for balancing purposes.

As part of this analysis, the utilization monitor 254 may rank the respective sets from greatest utilization to lowest utilization, and may further calculate some delta increment between these values and compare this delta increment to a predetermined threshold (e.g., an imbalance condition may be declared if one set is experiencing at least 50% more traffic, however measured, as compared to the lowest utilized set, etc.). An imbalance condition may be automatically declared if a particular set enters a DW, or heightened monitoring and lower thresholds may be applied to support the DW operation. Block 276 shows the identification of a first (main) set having the highest amount of workload traffic. From this, the workload adjustment manager 256 (FIG. 1) offloads, at block 278, a portion of the workload traffic to the op space of a different set having a lower traffic level. The requisite metadata adjustments are made to ensure the offloaded data are tracked and available for servicing.

At block 280, the offloaded workload data sets are migrated back to the first set at a subsequent time when there has been a reduction in the amount of traffic applied to the first set. This may be carried out using a garbage collection operation to only transfer those data sets that are still current version data (see the discussion of garbage collection operations in FIG. 8 above).

Generally, it is contemplated, particularly in a write dominant environment, that only a portion of the write sets written to the op space of another set will eventually need to be transferred back to the original set that owns the data. This is because there is a likelihood that some or many of the offloaded writes will be superseded by subsequent writes, either to a user GCU or a different op GCU.

Figure 14:
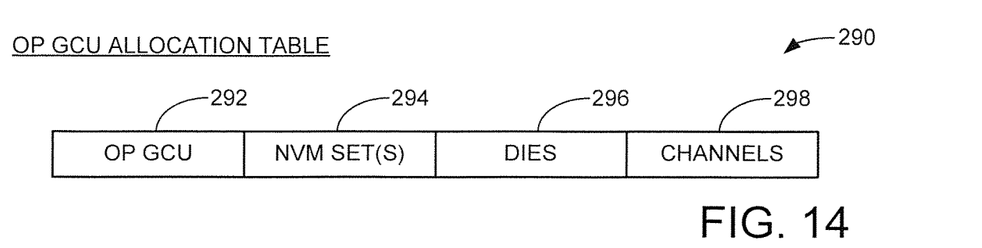
FIG. 14 shows a format for an OP CGU ALLOCATION TABLE used by the workload controller of FIG. 10 in some embodiments.

The op GCUs 268 (FIG. 11) can be pre-formed, or can be formed on-the-fly as needed. In some cases, the workload manager 256 can maintain an OP GCU Allocation Table 290 as illustrated in FIG. 14. The table can be arranged as a data structure in a local memory that lists various available op GCUs 268 with different characteristics suitable for selection at a given time.

The table 290 is shown to include a number of entries, with each entry having an op GCU designation field 292, an NVM set(s) field 294, a dies field 296 and a channels field 298. The op GCU designation field is a logical identifier to identify each of the op GCUs in the system. The NVM set(s) field 294 identifies the NVM sets 260 in which the associated op GCU is resident. While embodiments presented above have suggested that each op GCU will be wholly resident within the associated NVM set, this is not necessarily required; in some cases, some erasure blocks can be contributed from different NVM sets to form GCUs that span multiple sets.

The dies field 296 identifies the dies on which the various erasure blocks in the op GCU are located, and the channels field 298 identifies the corresponding channels linked to the dies. In this way, an intelligent decision can be made by the workload manager 256 to select an appropriate op GCU 268 that will not tend to interfere with the current workload being presented to the main NVM set; for example, data sets can be offloaded to dies and channels not currently being used to service the commands for the main NVM set, etc.

It will now be appreciated that the various embodiments present a number of benefits over the art. Providing a workload manager circuit to manage the use of shared resources among various die sets can ensure enhanced performance across all of the sets.

While not necessarily required, the use of separate and distinct map portions for each of a number of different sets can enable more efficient management of the metadata used to control data transfers with each set while maintaining deterministic performance of the SSD or other data storage device. While the various embodiments have been described in terms of an SSD in an NVMe environment, other types of storage devices and operational environments can be used as desired. Flash memory is a particularly suitable NVM, but other forms of data storage memory can be used.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
   dividing a population of semiconductor memory dies in a non-volatile memory (NVM) into a plurality of die sets each separately assigned to a different user, the semiconductor memory dies connected to a controller circuit using a number of parallel channels;
   arranging each die set into user garbage collection units (GCU) for the storage of user data blocks from an associated user and global GCUs for the storage of user data blocks from a user of a different die set;
   servicing host input/output (I/O) commands to transfer user data blocks between respective user GCUs of respective die sets;
   detecting an imbalance condition in which a workload traffic level of a first die set exceeds a workload traffic level of a second die set; and
   offloading at least one of the host I/O commands for the first die set for servicing using a selected global GCU of the second die set responsive to the detected imbalance condition.

2. The method of claim 1, wherein the offloading of the at least one of the host I/O commands comprises writing a parity set to the selected global GCU of the second die set.

3. The method of claim 2, further comprising subsequently transferring the parity set from the selected global GCU of the second die set to a selected user GCU of the first die set responsive to a conclusion of the detected imbalance condition.

4. The method of claim 1, wherein each of the user GCUs in each die set comprises a total number N erasure blocks, with each erasure block located on a different one of the dies in an associated die set.

5. The method of claim 1, wherein the imbalance condition is detected responsive to a total volume of data transferred to the first die set to service the host I/O commands exceeding a total volume of data transferred to the second die set to service the host I/O commands by a predetermined threshold amount.

6. The method of claim 1, wherein the imbalance condition is detected responsive to an associated user of the first die set declaring a deterministic window (DW) of operation to provide a period of guaranteed transfer rate performance.

7. The method of claim 1, wherein each die set is formed of semiconductor memory dies connected to each of the parallel channels.

8. The method of claim 1, wherein each die set is formed of semiconductor memory dies that are connected to less than all of the parallel channels.

9. The method of claim 1, further comprising generating a separate set of map data for each die set as a forward map having a transition layer to associate a logical address of each user data block of a corresponding die set with a physical address within the die set at which the user data block is stored, and wherein the sets of map data for the first and second die sets are updated to reflect the storage of a parity data set to an overprovisioning (OP) GCU in the second die set.

10. The method of claim 9, wherein the OP GCU includes erasure blocks disposed within the second die set as well as erasure blocks in at least a third die set.

11. The method of claim 9, wherein the servicing of the host I/O commands with the first die set uses a first subset of the number of parallel channels in the NVM, and wherein the OP GCU selected in the second die set uses a different, non-overlapping second subset of the channels in the NVM.

12. The method of claim 1, wherein each of the semiconductor memory dies is characterized as a NAND flash memory die comprising a plurality of flash memory cells in which data are stored in relation to accumulated charge in each cell.

13. An apparatus comprising:
   a non-volatile memory (NVM) comprising a population of semiconductor memory dies to which are connected a number of parallel channels;
   a set provisioning manager circuit configured to apportion the semiconductor memory dies into a plurality of die sets each configured to store user data blocks associated with a different user into user garbage collection units (GCUs) that are allocated and erased as a unit, the set provisioning manager circuit further configured to form at least one global GCU in each die set configured to store user data blocks from a different user associated with a different die set;
   a utilization monitor circuit configured to detect an imbalance condition in which a workload traffic level of a first die set exceeds a workload traffic level of a second die set responsive to host I/O commands received from associated users; and
   a workload manager circuit configured to direct at least one host I/O command for the first die set for servicing by a selected global GCU of the second die set responsive to the detected imbalance condition.

14. The apparatus of claim 13, wherein the host I/O commands comprise hot data transfers to transfer user data blocks between user GCUs in the respective die sets and host devices corresponding to associated users.

15. The apparatus of claim 13, wherein the at least one I/O command comprises writing a parity set to the selected global GCU of the second die set.

16. The apparatus of claim 13, wherein the workload manager circuit maintains an allocation table as a data structure in a memory that lists each available global GCU and selects a GCU of the second die set responsive to a determination that operation of the selected GCU of the second die set will not conflict with the servicing of the host I/O commands to user GCUs of the first die set.

17. The apparatus of claim 13, wherein the workload manager circuit further operates to perform a garbage collection operation upon a selected OP GCU of the second die set to transfer a parity data set from the selected GCU to a selected user GCU of the first die set responsive to a conclusion of the detected imbalance condition.

18. The apparatus of claim 13, wherein the selected global GCU includes erasure blocks disposed within the second die set as well as erasure blocks in at least a third die set.

19. The apparatus of claim 13, wherein the servicing of the host I/O commands with the first die set uses a first subset of the channels in the NVM, and wherein the GCU selected in the second die set uses a different, non-overlapping second subset of the channels in the NVM.

20. The apparatus of claim 13, characterized as a solid-state drive (SSD) configured in accordance with the NVMe (Non-Volatile Memory Express) specification, and wherein each die set comprises a separate namespace in accordance with the NVMe specification for each of a number of associated users.

* * * * *